US012218615B2

(12) United States Patent
Dementyev et al.

(10) Patent No.: US 12,218,615 B2
(45) Date of Patent: Feb. 4, 2025

(54) MAINTAINING A TEMPERATURE OF AN ELECTRIC MOTOR BELOW A THRESHOLD TEMPERATURE WHILE THE ELECTRIC MOTOR IS STALLED TO GENERATE HEAT

(71) Applicant: Google LLC, Mountain View, CA (US)

(72) Inventors: Artem Dementyev, Somerville, MA (US); Dimitri Kanevsky, Ossinning, NY (US)

(73) Assignee: GOOGLE LLC, Mountain View, CA (US)

( * ) Notice: Subject to any disclaimer, the term of this patent is extended or adjusted under 35 U.S.C. 154(b) by 205 days.

(21) Appl. No.: 17/886,197

(22) Filed: Aug. 11, 2022

(65) Prior Publication Data

US 2024/0056017 A1    Feb. 15, 2024

(51) Int. Cl.
*H02P 29/60* (2016.01)
*G08B 6/00* (2006.01)

(52) U.S. Cl.
CPC .............. *H02P 29/60* (2016.02); *G08B 6/00* (2013.01)

(58) Field of Classification Search
CPC .................................. G08B 6/00; H02P 29/60
USPC ......................................................... 318/139
See application file for complete search history.

(56) References Cited

U.S. PATENT DOCUMENTS 9,641,122 B2 * 5/2017 Romanowich ....... H02H 7/0852
2017/0093318 A1   3/2017 Ge et al.
2020/0405403 A1 * 12/2020 Shelton, IV ....... A61B 17/3421
2021/0064136 A1   3/2021 Chassot
2021/0083617 A1 * 3/2021 Xie .......................... H02P 29/64
2021/0311552 A1   10/2021 Lee et al.
2022/0220950 A1 * 7/2022 Janecek .................. F04B 9/045

FOREIGN PATENT DOCUMENTS

WO    WO 2020/087999    7/2020

OTHER PUBLICATIONS

KR 101965054 B1 Vehicle Running Control Apparatus Date Published Apr. 2, 2019 (Year: 2019).*
Inoue et al. (CN 101511615 B) Suspension System For Vehicle Date Published Aug. 19, 2009 (Year: 2009).*

(Continued)

*Primary Examiner* — Jorge L Carrasquillo
(74) *Attorney, Agent, or Firm* — DORITY & MANNING P.A.

(57) ABSTRACT

An electronic apparatus includes an electric motor, driver circuitry to drive the electric motor, a temperature sensor to detect a temperature of the electric motor, and one or more processors. The one or more processors control the driver circuitry to drive the electric motor according to a predetermined voltage signal to cause the electric motor to stall and generate heat, receive information about the temperature of the electric motor detected by the temperature sensor while the electric motor is stalled, and maintain a temperature of the electric motor below a threshold temperature value while the electric motor is stalled based on the information about the temperature of the electric motor detected by the temperature sensor while the electric motor is stalled.

21 Claims, 8 Drawing Sheets

(56) References Cited

OTHER PUBLICATIONS

Abdullah et al., "Design of a Hybrid Haptic Wearable Device for Upper Limb Amputees to Recover the Missing Sensation", International Journal of Mechanical Engineering, vol. 7, No. 1, 2022, 20 pages.
Amazon, "Bosch Men's 12-Volt Max Lithium-Ion Soft Shell Heated Jacket Kit with 2.0Ah Battery, Charger and Holster PSJ120S-102", https://www.amazon.com/dp/B00MXZI3XQ/, retrieved on Aug. 25, 2022, 7 pages.
Bhatia et al., "Soma-noti: Delivering Notifications Through Underclothing Wearables", 2021 CHI Conference on Human Factors in Computing Systems, May 8-13, 2021, pp. 1-8.
Nemah et al., "A Wearable Hybrid Haptic Feedback Stimulation Device for Upper Limb Prosthesis", International Journal of Mechanical & Mechatronics Engineering IJMME-IJENS, vol. 19, No. 5, Oct. 2019, 12 pages.
Peiris et al., "Thermalbracelet: Exploring thermal haptic feedback around the wrist" 2019 CHI Conference on Human Factors in Computing Systems, May 4-9, 2019, pp. 1-11.
Song et al., "Hot & tight: exploring thermo and squeeze cues recognition on wrist wearables" 2015 ACM International Symposium on Wearable Computers, Sep. 7-11, 2015, pp. 39-42.
Wilson et al., "Some like it hot: thermal feedback for mobile devices", SIGCHI Conference on Human Factors in Computing Systems, May 7-12, 2011, pp. 2555-2564.

* cited by examiner

MAINTAINING A TEMPERATURE OF AN ELECTRIC MOTOR BELOW A THRESHOLD TEMPERATURE WHILE THE ELECTRIC MOTOR IS STALLED TO GENERATE HEAT

FIELD

The disclosure relates generally to electronic apparatuses. More particularly, the disclosure relates to generating heat by stalling an electric motor of an electronic apparatus and maintaining a temperature of the electric motor below a threshold temperature while the electric motor is stalled based on a temperature of the electric motor detected by a temperature sensor.

BACKGROUND

Haptic technology includes linear resonant actuator (LRA) technology which implements a linear vibration motor that generates vibrations. Such vibrations communicate a limited amount of information to the user and may cause some users to feel uncomfortable or distracted as vibrations can be loud and disruptive and/or cause discomfort.

SUMMARY

Aspects and advantages of embodiments of the disclosure will be set forth in part in the following description, or can be learned from the description, or can be learned through practice of the example embodiments.

In an example embodiment, an electronic apparatus, such as an electronic article of clothing, a gaming controller or other electronic handheld device, a watch, glasses, jewelry, and the like, is provided. The electronic apparatus includes an electric motor, driver circuitry configured to drive the electric motor, a temperature sensor configured to detect a temperature of the electric motor, and one or more processors configured to: control the driver circuitry to drive the electric motor according to a Predetermined voltage signal to cause the electric motor to stall and generate heat, and receive information about the temperature of the electric motor detected by the temperature sensor while the electric motor is stalled, and maintain a temperature of the electric motor below a threshold temperature value while the electric motor is stalled based on the information about the temperature of the electric motor detected by the temperature sensor while the electric motor is stalled.

In some implementations, the electric motor includes an alternating current linear electric motor.

In some implementations, the driver circuitry includes an H-bridge circuit or a D-class amplifier.

In some implementations, the predetermined voltage signal is a direct current voltage signal or a pulse width modulation voltage signal.

In some implementations, the electronic apparatus further includes a motor housing which houses the electric motor, and the temperature sensor is attached to an outside surface of the motor housing or an inside surface of the motor housing.

In some implementations, when the electronic apparatus is worn by a user, the motor housing contacts a body part of the user such that the heat generated while the electric motor is stalled warms the body part of the user via the motor housing.

In some implementations, the one or more processors are configured to control the driver circuitry to drive the electric motor according to the predetermined voltage signal to cause the electric motor to stall and generate heat at a predetermined rate.

In some implementations, the one or more processors are configured to maintain the temperature of the electric motor below the threshold temperature value while the electric motor is stalled by reducing a voltage level of the predetermined voltage signal or by stopping a supply of power to the electric motor.

In some implementations, the temperature sensor includes at least one of a thermistor or a thermocouple.

In some implementations, the electric motor includes a first electric motor and a second electric motor, the driver circuitry includes first driver circuitry configured to drive the first electric motor and second driver circuitry configured to drive the second electric motor, and the one or more processors are configured to: control the first driver circuitry to drive the first electric motor according to the predetermined voltage signal to cause the first electric motor to stall and generate heat, and control (e.g., simultaneously) the second driver circuitry to drive the second electric motor according to another predetermined voltage signal to cause the electronic apparatus to vibrate.

In some implementations, the electric motor includes a first electric motor and a second electric motor disposed adjacent to the first electric motor, the driver circuitry includes first driver circuitry configured to drive the first electric motor and second driver circuitry configured to drive the second electric motor, the temperature sensor includes a first temperature sensor configured to detect a temperature of the first electric motor and a second temperature sensor configured to detect a temperature of the second electric motor, and the one or more processors are configured to: control the first driver circuitry to drive the first electric motor according to the predetermined voltage signal to cause the first electric motor to stall and generate heat, and control (e.g., simultaneously) the second driver circuitry to drive the second electric motor according to the predetermined voltage signal to cause the second electric motor to stall and generate heat.

In some implementations, the one or more processors are configured to alternate between controlling the driver circuitry to drive the electric motor according to the predetermined voltage signal to cause the electric motor to stall and generate heat and controlling the driver circuitry to drive the electric motor according to another predetermined voltage signal to cause the electronic apparatus to vibrate.

In some implementations, the electronic apparatus includes an electronic article of clothing, an electronic handheld gaming device, an electronic watch, electronic glasses, or electronic jewelry.

In some implementations, the electronic apparatus includes an input device to receive an input from a user, and in response to the input being received by the input device, the one or more processors are configured to control the driver circuitry to drive the electric motor according to the predetermined voltage signal to cause the electric motor to stall and generate heat.

In some implementations, in response to a function of the electronic apparatus or an external computing device being operated, the one or more processors are configured to control the driver circuitry to drive the electric motor according to the predetermined voltage signal to cause the electric motor to stall and generate heat, to thereby notify a user of the function of the electronic apparatus or the external computing device being operated.

In some implementations, in response to the temperature being detected by the temperature sensor being greater than or equal to the threshold temperature value while the electric motor is stalled, the one or more processors are configured to control the driver circuitry to stop supplying power to the electric motor.

In some implementations, the electronic apparatus includes a sensor configured to detect an emotional state of a user of the electronic apparatus, and the one or more processors are configured to control the driver circuitry to drive the electric motor according to the predetermined voltage signal to cause the electric motor to stall and generate heat, based on the emotional state detected by the sensor.

In an example embodiment, a computer-implemented method for an electronic apparatus including an electric motor, driver circuitry, and a temperature sensor is provided. The computer-implemented method includes controlling the driver circuitry to drive the electric motor according to a predetermined voltage signal to cause the electric motor to stall and generate heat, receiving information about a temperature of the electric motor detected by the temperature sensor while the electric motor is stalled, and maintaining a temperature of the electric motor below a threshold temperature value while the electric motor is stalled based on the information about the temperature of the electric motor detected by the temperature sensor while the electric motor is stalled.

In some implementations, the method is implemented according to any of the variations of the electronic apparatus disclosed herein.

In an example embodiment, a non-transitory computer-readable medium which stores instructions that are executable by one or more processors of an electronic apparatus is provided. The non-transitory computer-readable medium stores instructions which are executable by one or more processors of the electronic apparatus. The instructions include: instructions to cause the one or more processors to control driver circuitry of the electronic apparatus to drive an electric motor of the electronic apparatus according to a predetermined voltage signal to cause the electric motor to stall and generate heat, instructions to receive information about a temperature of the electric motor detected by a temperature sensor of the electronic apparatus while the electric motor is stalled, and instructions to maintain a temperature of the electric motor below a threshold temperature value while the electric motor is stalled based on the information about the temperature of the electric motor detected by the temperature sensor while the electric motor is stalled.

The non-transitory computer-readable medium may store additional instructions to execute other aspects and operations of the electronic apparatus and computer-implemented method as described herein.

These and other features, aspects, and advantages of various embodiments of the disclosure will become better understood with reference to the following description, drawings, and appended claims. The accompanying drawings, which are incorporated in and constitute a part of this specification, illustrate examples of the disclosure and, together with the description, serve to explain the related principles.

BRIEF DESCRIPTION OF THE DRAWINGS

Detailed discussion of example embodiments directed to one of ordinary skill in the art is set forth in the specification, which makes reference to the appended drawings, in which.

DETAILED DESCRIPTION

Figure 1:
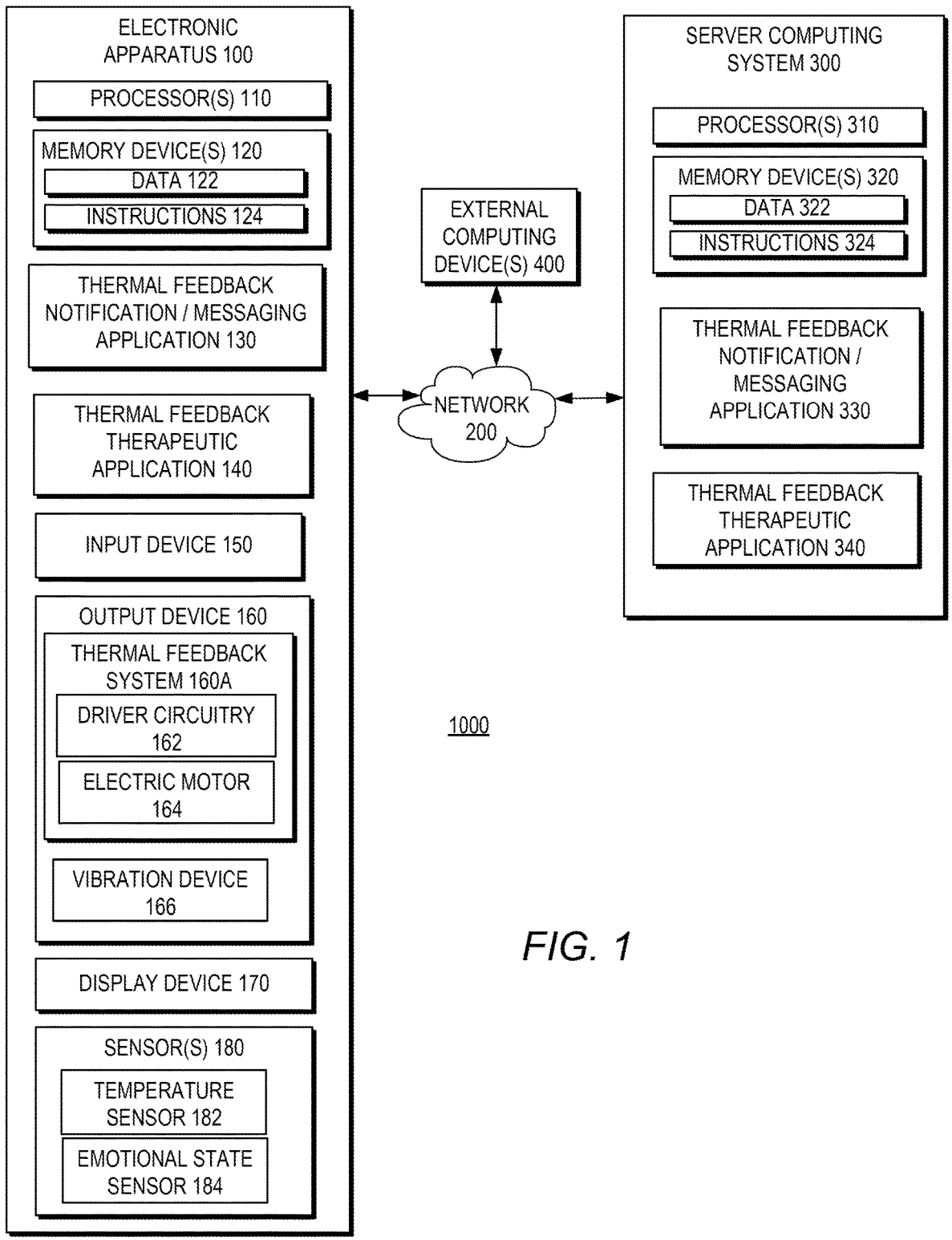
FIG. 1 is an example system including block diagrams of a system including an electronic apparatus, a server computing system, and one or more external computing devices, according to one or more examples of the disclosure.

Reference now will be made to embodiments of the disclosure, one or more examples of which are illustrated in the drawings. Each example is provided by way of explanation of the disclosure and is not intended to limit the disclosure. In fact, it will be apparent to those skilled in the art that various modifications and variations can be made to the disclosure without departing from the scope or spirit of the disclosure. For instance, features illustrated or described as part of one embodiment can be used with another embodiment to yield a still further embodiment. Thus, it is intended that the disclosure covers such modifications and variations as come within the scope of the appended claims and their equivalents.

Terms used herein are used to describe the example embodiments and are not intended to limit and/or restrict the disclosure. The singular forms "a," "an" and "the" are intended to include the plural forms as well, unless the context clearly indicates otherwise. In this disclosure, terms such as "including", "having", "comprising", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, the elements are not limited by these terms. Instead, these terms are used to distinguish one element from another element. For example, without departing from the scope of the disclosure, a first element may be termed as a second element, and a second element may be termed as a first element.

The term "and/or" includes a combination of a plurality of related listed items or any item of the plurality of related listed items. For example, the scope of the expression or phrase "A and/or B" includes the item "A", the item "B", and the combination of items "A and B".

In addition, the scope of the expression or phrase "at least one of A or B" is intended to include all of the following: (1) at least one of A, (2) at least one of B, and (3) at least one of A and at least one of B. Likewise, the scope of the expression or phrase "at least one of A, B, or C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

Examples of the disclosure are directed to an electronic apparatus, for example, an electronic article of clothing (e.g., jackets, scarves, socks, gloves, pants, hats, etc.), a gaming controller or other electronic handheld device, a watch (e.g., a wristwatch or smartwatch), electronic glasses (e.g., smart glasses, virtual reality glasses, augmented reality glasses, etc.), electronic jewelry (e.g., bracelets, rings, anklets, necklaces, etc.), and the like. More particularly, the electronic apparatus uses existing components such as an electric motor, driver circuitry, and a temperature sensor to intentionally bring the electric motor into a stall condition or stall state, causing the stalled electric motor to generate heat. A motor housing which contains the electric motor may in turn be heated by the stalled electric motor. The temperature of the electric motor can be regulated using the temperature sensor. The motor housing may be in direct or indirect contact with a user of the electronic apparatus, transferring heat to the user.

In some implementations, the heating sensation provided to the user via the motor housing may be used to provide thermal feedback to the user, for example, to make the person feel better, to provide a notification to communicate simple messages, etc. For example, the notification may inform a user of an event such as an incoming phone call or text message to a smartphone that is communicatively coupled to the electronic apparatus (e.g., wirelessly) or of a function associated with a home appliance communicatively coupled to the electronic apparatus (e.g., a wireless communication from a thermostat device regarding a heating or cooling function being activated).

According to some implementations of the disclosure, an electric motor may be implemented as an LRA and driven so as to provide thermal feedback to a user instead of, or in addition to, haptic feedback involving vibrations. According to examples of the disclosure, an unmodified LRA can be configured to provide thermal feedback by changing the driving waveform (e.g., by driving the electric motor according to a predetermined voltage signal) and using the temperature sensor (e.g., a thermistor or thermocouple) to regulate the temperature of the LRA. Thermal feedback can be effective for providing notifications or messages to a user and for therapeutic or medical purposes (e.g., to help autistic people to feel a "warmness" in another person's voice or face or speech expressions, to help calm people who feel depressed, etc.). For example, an electronic apparatus may include one or more sensors which are configured to detect an emotional state of a user (e.g., to detect whether the user is angry, sad, excited, depressed, anxious, etc.). For example, the electronic apparatus may be configured to provide thermal feedback to the user via the LRA based on the detected emotional state (e.g., in response to detecting that the user is sad, anxious, depressed, etc.). In some implementations, the electronic apparatus may include an input device by which the user can provide an input requesting the electronic apparatus to provide the thermal feedback.

According to some implementations of the disclosure, the LRA includes an alternating current (AC) linear electric motor. For example, heating can be achieved by driving the LRA with the predetermined voltage signal, which may include a direct current (DC) voltage signal or a pulse width modulation (PWM) signal instead of an AC signal such as a sine wave. Driving the LRA with the predetermined voltage signal causes the motor to stall and produce heat without producing any movements or vibrations. For example, the LRA may be driven by a driver circuitry which may include an H-bridge circuit, a D-class amplifier, or other driver chip or driver circuitry.

In some implementations, the LRA may be driven to produce both vibrations and heat. For example, the LRA can be driven with a high amplitude AC signal to generate a vibration of the LRA so that a user can feel or sense the electronic apparatus being vibrated. The electronic apparatus can alternate between controlling the driver circuitry to drive the electric motor according to the predetermined voltage signal (such as the DC voltage signal or the PWM signal) so as to cause the electric motor to stall and generate heat, and controlling the driver circuitry to drive the electric motor according to another predetermined voltage signal (an AC signal) so as to cause the electronic apparatus to vibrate.

For example, the LRA can be driven according to the predetermined voltage signal at various voltage levels to vary a rate of increase of the temperature of the electric motor over time when the electric motor is in the stall condition. For example, when the electric motor (e.g., LRA) is driven at 3.3 volts in a stall condition, a temperature of the electric motor may rise from about 25 degrees Celsius to about 50 degrees Celsius in about 28 seconds, and when the electric motor is driven at 4.3 volts in a stall condition, a temperature of the electric motor may rise from about 25 degrees Celsius to about 50 degrees Celsius in about 18 seconds. By applying different voltage levels, different thermal feedback experiences can be felt by the user, which may be useful for providing notifications or messages, or for providing therapeutic effects (e.g., a lower voltage level may be more appropriate for providing a gradual warming effect to a user over a longer period of time than a sharper increase in temperature in a relatively shorter period of time).

In some implementations, the temperature sensor may be attached to the outside surface (an external portion) of the motor housing or attached to an inside surface (an internal portion) of the motor housing. The temperature sensor may be configured to detect a temperature associated with the electric motor and transmit information relating to the detected temperature to one or more processors (e.g., a controller or microcontroller) which are configured to control or regulate the temperature of the electric motor so as to avoid overheating. For example, one or more processors of the electronic apparatus may be configured to maintain a temperature detected by the temperature sensor below a threshold temperature value (e.g., about 60 degrees Celsius) while the electric motor is stalled based on the information about the temperature detected by the temperature sensor. If the temperature detected by the temperature sensor indicates that the temperature of the electric motor is equal to or greater than the threshold temperature value (or is rapidly approaching the threshold temperature value), the one or more processors may be configured to control the driver circuitry to stop supplying power to the electric motor to bring the electric motor out of the stall condition or stall state. In some implementations, the one or more processors may be configured to control the driver circuitry to stop supplying power to the electric motor after the electric motor has been in the stall condition or stall state for a period of time greater than a threshold period of time which may be adjustable according to a voltage level that is applied and/or may be settable by a user (e.g., 1 minute, 5 minutes, 10 minutes, etc.). For example, a higher voltage level may have a lower threshold period of time relative to a lower voltage level.

In some implementations, the one or more processors are configured to control the driver circuitry such that the electric motor is driven according to the predetermined voltage signal so as to cause the electric motor to stall and generate heat at a predetermined rate. For example, the electric motor may be driven according to the predetermined voltage signal so as to cause the electric motor to stall and generate heat at a predetermined rate of about three degrees Celsius per second. Therefore, the temperature of the electric motor increases steadily over time to provide thermal cues to a user who is in contact (directly or indirectly) with the electronic apparatus having the electric motor. In some implementations, the electric motor may be driven according to the predetermined voltage signal so as to cause the electric motor to stall and generate heat at a predetermined rate (e.g., of about three degrees Celsius per second) above a normal skin temperature for a human (e.g., about 30 degrees Celsius to 35 degrees Celsius).

In some implementations, the electronic apparatus can include a plurality of LRAs which are disposed adjacent to one another, for example, in a stacked manner. For example, a first LRA may correspond to a first electric motor and first driver circuitry may be configured to drive the first electric motor and a second LRA may correspond to a second electric motor and second driver circuitry may be configured to drive the second electric motor. One or more processors of the electronic apparatus may be configured to control the first driver circuitry to drive the first electric motor according to the predetermined voltage signal so as to cause the first electric motor to stall and generate heat, and simultaneously control the second driver circuitry to drive the second electric motor according to the predetermined voltage signal so as to cause the first electric motor to stall and generate heat. In some implementations, when the first electric motor (e.g., first LRA) and second electric motor (e.g., second LRA) are arranged or disposed to be adjacent to one another, the heat from generated from the stalled first electric motor can be directed in a same direction as the heat from generated from the stalled second electric motor such that a user can experience an increased rate (or greater amount) of heating compared to a single stalled electric motor, by virtue of the accumulated (sum) of heat generated by the first and second electric motors. For example, notifications or simple messages may be transmitted to a user by stalling a single electric motor (e.g., to convey that a text message has been received by the user's smartwatch or smartphone), by stalling multiple electric motors (e.g., to convey that a phone call or voicemail message has been received by the user's smartwatch or smartphone), or by switching between stalling a single electric motor and stalling multiple electric motors (e.g., to convey that an email message has been received in the user's inbox or the electronic apparatus has a low battery condition).

In some implementations, the electronic apparatus can include a plurality of LRAs. For example, a first LRA may correspond to a first electric motor and first driver circuitry may be configured to drive the first electric motor and a second LRA may correspond to a second electric motor and second driver circuitry may be configured to drive the second electric motor. One or more processors of the electronic apparatus may be configured to control the first driver circuitry to drive the first electric motor according to the predetermined voltage signal so as to cause the first electric motor to stall and generate heat, and simultaneously control the second driver circuitry to drive the second electric motor according to another predetermined voltage signal so as to cause the electronic apparatus to vibrate. Therefore, the electronic apparatus can use a combination of LRAs to provide notifications or messages, for example, according to a pattern of the vibrations and heating provided via the combination of LRAs.

As discussed above, in some implementations the electronic apparatus may include a plurality of LRAs. The plurality of LRAs may be particularly arranged so as to provide a specific thermal feedback to the user. For example, for an electronic article of clothing such as a scarf or hat, the LRAs may be spaced apart in a circumferential direction so that a user may receive varying thermal feedback at various touchpoints to provide different indications or notifications, or to provide different heating sensations to the user. Likewise, for an electronic piece of jewelry such as a necklace or bracelet, the LRAs may also be spaced apart in a circumferential direction so that a user may receive varying thermal feedback at various touchpoints to provide different indications or notifications, or to provide different heating sensations to the user.

In some implementations, the electric motor may be an AC eccentric vibrator electric motor.

Example aspects of the disclosure provide several technical effects, benefits, and/or improvements in electronic apparatus technology and technologies in which feedback is provided to a user with respect to an electronic apparatus that is operated by and/or worn by a user. For example, according to one or more examples of the disclosure, an electric motor can be intentionally brought into a stall condition or stall state, causing the stalled electric motor to generate heat which can be felt by the user. The heating sensation provided to the user (e.g., via a motor housing which encloses the electric motor) may be used to provide thermal feedback to the user, for example, to make the person feel better, to provide a notification to communicate simple messages, etc. The electronic apparatus also leverages existing components of a LRA to provide thermal feedback to a user so additional sensors or components are not needed.

Known haptic technology uses vibrations to provide notifications or feedback to a user and may cause some users to feel uncomfortable or distracted as vibrations can be loud and disruptive and/or cause discomfort. According to the examples disclosed herein, the electronic apparatus can provide thermal feedback to a user which may be a quieter and more enjoyable and less distracting experience for the user than haptic technology which is implemented using vibrations.

Referring now to the drawings, FIG. 1 illustrates block diagrams of a system including an electronic apparatus, a server computing system, and one or more external computing devices, according to one or more examples of the disclosure. In FIG. 1, the example system includes an electronic apparatus 100, a server computing system 300, and one or more external computing devices 400 which are connected with one another over a network 200. Any communications interfaces suitable for communicating via the network 200 (such as a network interface card) may be utilized as appropriate or desired by the electronic apparatus 100, server computing system 300, and one or more external computing devices 400.

The electronic apparatus 100 may include, for example, an electronic article of clothing (e.g., jackets, scarves, socks, gloves, pants, hats, etc.), a gaming controller or other electronic handheld device, a watch (e.g., a wristwatch or smartwatch), electronic glasses (e.g., smart glasses, virtual reality glasses, augmented reality glasses, etc.), electronic jewelry (e.g., bracelets, rings, anklets, necklaces, etc.), and the like. The server computing system 300 may include a server, or a combination of servers (e.g., a web server, application server, etc.) in communication with one another, for example in a distributed fashion. The one or more external computing devices 400 may include a personal computer, a smartphone, a laptop, a tablet computer, and the like.

According to some implementations of the disclosure, the electronic apparatus 100 may communicate with the server computing system 300 to execute a thermal feedback notification and messaging application 330 which may be used to activate or control a thermal feedback system 160A to be described in more detail later. According to some implementations of the disclosure, the electronic apparatus 100 may communicate with the server computing system 300 to execute a thermal feedback therapeutic application 340 which may be used to activate or control the thermal feedback system 160A.

According to some implementations of the disclosure, the electronic apparatus 100 may communicate with the one or more external computing devices 400 to execute a thermal feedback notification and messaging application 330 which may be used to activate or control the thermal feedback system 160A. Similarly, according to some implementations of the disclosure, the electronic apparatus 100 may communicate with the one or more external computing devices 400 to execute the thermal feedback therapeutic application 340 which may be used to activate or control the thermal feedback system 160A.

As an example, the one or more external computing devices 400 may include a home appliance such as a home security system or a thermostat device which controls a heating and cooling system. In response to a function of the home appliance being operated (e.g., a heating operation or cooling operation being activated), the home appliance may be configured to execute its local thermal feedback notification and messaging application (or execute the thermal feedback notification and messaging application 330 stored at the server computing system 300) and send a notification or message to the electronic apparatus 100 to control the thermal feedback system 160A of the electronic apparatus 100. For example, the thermal feedback system 160A may be controlled to cause the electric motor 164 to stall and generate heat. The generated heat may have certain characteristics (e.g., a certain temperature), be generated with a certain pattern (e.g., by changing or alternating a level of a voltage applied via a predetermined voltage signal), or be applied using a plurality of electric motors, and combinations thereof.

For example, the network 200 may include any type of communications network such as a local area network (LAN), wireless local area network (WLAN), wide area network (WAN), personal area network (PAN), virtual private network (VPN), or the like. For example, wireless communication between elements of the examples described herein may be performed via a wireless LAN, Wi-Fi, Bluetooth, ZigBee, Wi-Fi direct (WFD), ultra wideband (UWB), infrared data association (IrDA), Bluetooth low energy (BLE), near field communication (NFC), a radio frequency (RF) signal, and the like. For example, wired communication between elements of the examples described herein may be performed via a pair cable, a coaxial cable, an optical fiber cable, an Ethernet cable, and the like. Communication over the network can use a wide variety of communication protocols (e.g., TCP/IP, HTTP, SMTP, FTP), encodings or formats (e.g., HTML, XML), and/or protection schemes (e.g., VPN, secure HTTP, SSL).

The electronic apparatus 100 may include one or more processors 110, one or more memory devices 120, a thermal feedback notification and messaging application 130, a thermal feedback therapeutic application 140, an input device 150, an output device 160, a display device 170, and one or more sensors 180. Each of the components of the electronic apparatus 100 may be operatively connected with one another via a system bus. For example, the system bus may be any of several types of bus structures that may further interconnect to a memory bus (with or without a memory controller), a peripheral bus, and/or a local bus using any of a variety of commercially available bus architectures.

The server computing system 300 may include one or more processors 310, one or more memory devices 320, a thermal feedback notification and messaging application 330, a thermal feedback therapeutic application 340. Each of the features of the server computing system 300 may be operatively connected with one another via a system bus. For example, the system bus may be any of several types of bus structures that may further interconnect to a memory bus (with or without a memory controller), a peripheral bus, and/or a local bus using any of a variety of commercially available bus architectures.

The one or more external computing devices 400 may include similar structural features as the server computing system 300 (e.g., one or more processors 310, one or more memory devices 320, thermal feedback notification and messaging application 330, and thermal feedback therapeutic application 340). Therefore, a description of these features in the context of the one or more external computing devices will not be repeated again for the sake of brevity.

For example, the one or more processors 110, 310 can be any suitable processing device that can be included in an electronic apparatus 100 or in the server computing system 300. For example, the one or more processors 110, 310 may include one or more of a processor, processor cores, a controller and an arithmetic logic unit, a central processing unit (CPU), a graphics processing unit (GPU), a digital signal processor (DSP), an image processor, a microcomputer, a field programmable array, a programmable logic unit, an application-specific integrated circuit (ASIC), a microprocessor, a microcontroller, etc., and combinations thereof, including any other device capable of responding to and executing instructions in a defined manner. The one or more processors 110, 310 can be a single processor or a plurality of processors that are operatively connected, for example in parallel.

The one or more memory devices 120, 320 can include one or more non-transitory computer-readable storage mediums, such as such as a Read Only Memory (ROM), Programmable Read Only Memory (PROM), Erasable Programmable Read Only Memory (EPROM), and flash memory, a USB drive, a volatile memory device such as a Random Access Memory (RAM), an internal or external hard disk drive (HDD), floppy disks, a blue-ray disk, or optical media such as CD ROM discs and DVDs, and combinations thereof. However, examples of the one or more memory devices 120, 320 are not limited to the above description, and the one or more memory devices 120, 320 may be realized by other various devices and structures as would be understood by those skilled in the art.

For example, the one or more memory devices 120 can store instructions, that when executed, cause the one or more processors 110 to control driver circuitry 162 to drive the electric motor 164 (e.g., a linear resonant actuator) according to a predetermined voltage signal (e.g., a DC voltage signal or a pulse width modulation (PWM) signal) to cause the electric motor 164 to stall and thereby generate heat, as described according to examples of the disclosure. For example, the one or more memory devices 120 can store instructions, that when executed, cause the one or more processors 110 to receive information about a temperature of the electric motor 164 which is detected by the temperature sensor 182 while the electric motor 164 is stalled, as described according to examples of the disclosure. For example, the one or more memory devices 120 can store instructions, that when executed, cause the one or more processors 110 to maintain the temperature of the electric motor 164 below a threshold temperature value while the electric motor 164 is stalled based on information about the temperature detected by the temperature sensor 182 while the electric motor 164 is stalled.

For example, the one or more memory devices 320 can store instructions, that when executed, cause the one or more processors 310 to execute one or more operations of the thermal feedback notification and messaging application 330 to control or cause an operation of the thermal feedback system 160A, as described according to examples of the disclosure. For example, the one or more memory devices 320 can store instructions, that when executed, cause the one or more processors 310 to execute one or more operations of the thermal feedback therapeutic application 340 to control or cause an operation of the thermal feedback system 160A, as described according to examples of the disclosure.

The one or more memory devices 120 can also include data 122 and instructions 124 that can be retrieved, manipulated, created, or stored by the one or more processors 110. In some examples, such data can be accessed and used as input to control driver circuitry 162 to drive the electric motor 164 (e.g., a linear resonant actuator) according to a predetermined voltage signal (e.g., a DC voltage signal or a pulse width modulation (PWM) signal) to cause the electric motor 164 to stall and thereby generate heat. In some examples, such data can be accessed and used as input to receive information about a temperature of the electric motor 164 which is detected by the temperature sensor 182 while the electric motor 164 is stalled and to maintain the temperature of the electric motor 164 below a threshold temperature value while the electric motor 164 is stalled based on information about the temperature detected by the temperature sensor 182 while the electric motor 164 is stalled.

The one or more memory devices 320 can also include data 322 and instructions 324 that can be retrieved, manipulated, created, or stored by the one or more processors 310. In some examples, such data can be accessed and used as input to execute one or more operations of the thermal feedback notification and messaging application 330 to control or cause an operation of the thermal feedback system 160A and to execute one or more operations of the thermal feedback therapeutic application 340 to control or cause an operation of the thermal feedback system 160A.

The thermal feedback notification and messaging application 130 and thermal feedback notification and messaging application 330 can include any application which causes or is capable of causing thermal feedback system 160A to be operated to cause the electric motor 164 (or a plurality of electric motors 164) to stall and generate heat as a form of communication to provide a notification or a message to a user of the electronic apparatus 100. For example, the thermal feedback notification and messaging application 130 and/or thermal feedback notification and messaging application 330 may be communicatively coupled to one or more external computing devices 400 such as a smartphone, a home appliance (e.g., a thermostat device, a security system, a refrigerator, etc.), a vehicle, and the like. The thermal feedback notification and messaging application 130 and/or thermal feedback notification and messaging application 330 may be configured to provide messages and notifications via the thermal feedback system 160A regarding a status of the electronic apparatus 100 or of the one or more external computing devices 400 or concerning operations or functions of the electronic apparatus 100 or of the one or more external computing devices 400.

The thermal feedback therapeutic application 140 and thermal feedback therapeutic application 340 can include any application which causes or is capable of causing thermal feedback system 160A to be operated to cause the electric motor 164 (or a plurality of electric motors 164) to stall and generate heat as a form of therapy for a user of the electronic apparatus 100. For example, the thermal feedback therapeutic application 140 and/or thermal feedback therapeutic application 340 may be configured to control the thermal feedback system 160A to cause the electric motor 164 (or a plurality of electric motors 164) to stall and generate heat in a manner that brings a feeling of comfort to the user. For example, the thermal feedback therapeutic application 140 and/or thermal feedback therapeutic application 340 may be configured to automatically control the thermal feedback system 160A to cause the electric motor 164 (or a plurality of electric motors 164) to stall and generate heat in a manner that brings a feeling of comfort to the user, in response to a sensor (e.g., the emotional state sensor 184 or of an externally disposed sensor) detecting that the user is in a particular emotional state (e.g., anxious, angry, depressed, etc.). The thermal feedback system 160A may be controlled to cause the electric motor 164 (or a plurality of electric motors 164) to stall and generate heat in a predetermined manner according to the detected emotional state. For example, a different voltage level may be applied with respect to the predetermined voltage signal for a detected first emotional state (e.g., depressed state) compared to a voltage level applied with respect to the predetermined voltage signal for a detected second emotional state (e.g., angry).

The electronic apparatus 100 may include an input device 150 configured to receive an input from a user and may include, for example, one or more of a keyboard (e.g., a physical keyboard, virtual keyboard, etc.), a mouse, a joystick, a button, a switch, an electronic pen or stylus, a gesture recognition sensor (e.g., to recognize gestures of a user including movements of a body part), an input sound device or voice recognition sensor (e.g., a microphone to receive a voice command), a track ball, a remote controller, a portable (e.g., a cellular or smart) phone, and so on. The input device 150 may also be embodied by a touch-sensitive display device having a touchscreen capability, for example. The input device 150 may be used by a user of the electronic apparatus 100 to provide an input to request to receive thermal feedback, to provide an input to execute the thermal feedback notification and messaging application 130 or the thermal feedback therapeutic application 140. The input device 150 may also be used by a user of the electronic apparatus 100 to provide an input to execute the thermal feedback notification and messaging application 330 or the thermal feedback therapeutic application 340, for example, via a web page. For example, the input may be a voice input, a touch input, a gesture input, a click via a mouse or remote controller, and so on.

Figure 2:
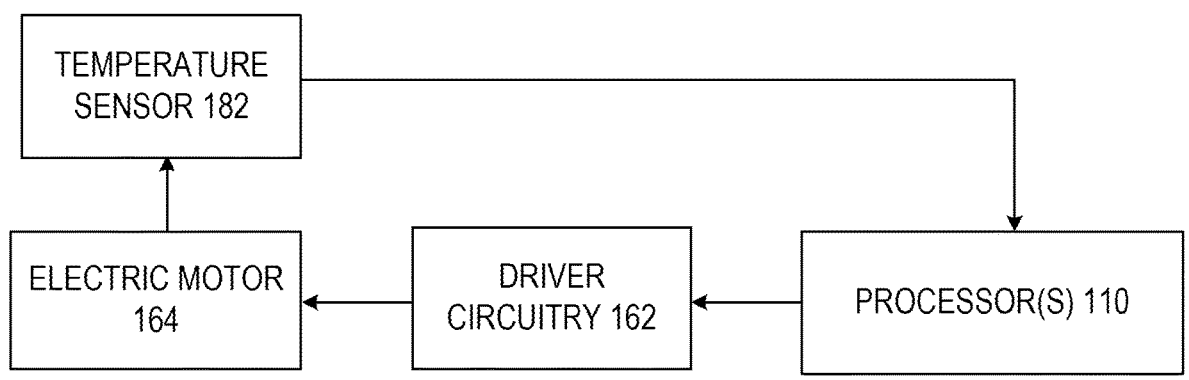
FIG. 2 is an example illustration of a thermal feedback system, according to one or more examples of the disclosure.

The electronic apparatus 100 includes an output device 160 configured to provide an output to the user and may include, for example, one or more of an audio device (e.g., one or more speakers), a haptic device to provide haptic feedback to a user (e.g., vibration device 166), a light source (e.g., one or more light sources such as LEDs which provide visual feedback to a user), the thermal feedback system 160A, and the like. According to various examples of the disclosure, the user may receive thermal feedback via the thermal feedback system 160A. For example, the thermal feedback system 160A may include driver circuitry 162 and the electric motor 164. In addition, though shown separately in FIG. 1, temperature sensor 182 and the one or more processors 110 may be considered as part of the thermal feedback system 160A, as shown in FIG. 2. The output device 160, and for example the thermal feedback system 160A and/or vibration device 1666, may provide various indications to inform, alert, or notify the user regarding an operating state of one or more external computing devices 400 or of the electronic apparatus 100 itself. The thermal feedback system 160A can also provide thermal feedback to a user for therapeutic purposes as described herein.

The electronic apparatus 100 includes a display device 170 which presents information viewable by the user, for example on a user interface (e.g., a graphical user interface). For example, the display device 170 may be a non-touch sensitive display. The display device 170 may include a liquid crystal display (LCD), a light emitting diode (LED) display, an organic light emitting diode (OLED) display, active matrix organic light emitting diode (AMOLED), flexible display, 3D display, a plasma display panel (PDP), a cathode ray tube (CRT) display, and the like, for example. However, the disclosure is not limited to these example display devices and may include other types of display devices. For example, the display device 170 may be configured to provide a graphical user interface by which the user can select various options with respect to the thermal feedback notification and messaging application 130 or the thermal feedback therapeutic application 140 (e.g., options by which the user can define messages or notifications which are communicated via the thermal feedback system 160A).

The electronic apparatus 100 includes one or more sensors 180. The one or more sensors 180 may include the temperature sensor 182. For example, the temperature sensor 182 may be configured to detect (sense) a temperature of the electric motor 164 and provide information indicating the temperature of the electric motor 164 to the one or more processors 110. The temperature sensor 182 may be disposed on an outer (external or exterior) surface (outer portion) of a motor housing containing the electric motor 164, or may be disposed on an inner (internal or interior) surface (inner portion) of the motor housing.

The one or more sensors 180 may include the emotional state sensor 184. For example, the emotional state sensor 184 may be configured to detect (sense) an emotional state of a user of the electronic apparatus 100. For example, the emotional state sensor 184 may include various sensors such as a camera which captures an image of a user, a microphone which captures sound, such as a user's voice, biometric sensors which detect biometric information such as a user's heart rate, blood pressure, temperature, and the like. For example, the emotional state sensor 184 can be used in connection with a computer program and/or machine learning algorithms to determine or predict a user's emotional state (e.g., based on the image of the user, a sound of the user's voice, biometric information of the user such as the user's heart rate, etc. that may indicate a user's stress or excitement level). As described herein, the emotional state sensor 184 may configured to provide information indicating the user's emotional state to the one or more processors 110 which may be configured to control the driver circuitry 162 to drive the electric motor 164 according to the predetermined voltage signal to cause the electric motor 164 to stall and generate heat, based on the emotional state detected by the emotional state sensor 184.

For example, the one or more sensors 180 may include other sensors such as an inertial measurement unit which includes one or more accelerometers and/or one or more gyroscopes. The one or more accelerometers may be used to capture motion information with respect to the electronic apparatus 100. The one or more gyroscopes may also be used additionally, or alternatively, to capture motion information with respect to the electronic apparatus 100. The one or more sensors 180 may also include other sensors such as a magnetometer, GPS sensor, and the like.

Referring to FIG. 2, an example illustration of a thermal feedback system is shown, according to one or more examples of the disclosure. In FIG. 2, the thermal feedback system 2000 includes the one or more processors 110, driver circuitry 162, electric motor 164, and temperature sensor 182.

In an example embodiment, the one or more processors 110 are configured to control the driver circuitry 162 to drive the electric motor 164 according to a predetermined voltage signal to cause the electric motor 164 to stall and generate heat (e.g., without causing the electronic apparatus 100 to move or vibrate). That is, the electric motor 164 may be intentionally brought into a stall condition or stall state to generate heat which may be transferred to a user directly or indirectly. For example, a motor housing which contains the electric motor 164 may in turn be heated by the stalled electric motor 164. The motor housing may be in direct or indirect contact with a user of the electronic apparatus 100, transferring heat to the user. For example, the driver circuitry 162 may include an H-bridge circuit or a D-class amplifier. For example, the predetermined voltage signal may be a direct current voltage signal or a pulse width modulation voltage signal. For example, the electric motor 164 may include an alternating current (AC) linear electric motor (e.g., a linear resonant actuator) or an AC eccentric vibrator electric motor.

The one or more processors 110 are configured to receive information about the temperature of the electric motor 164 while the electric motor is stalled, based on the temperature detected by the temperature sensor 182. For example, the temperature sensor 182 may include at least one of a thermistor or a thermocouple. The temperature of the electric motor 164 can also be regulated using the temperature sensor 182.

The one or more processors 110 are configured to maintain a temperature of the electric motor 164 below a threshold temperature value while the electric motor 164 is stalled based on the information about the temperature of the electric motor 164 detected by the temperature sensor 182 while the electric motor 164 is stalled. Maintaining the temperature of the electric motor 164 below the threshold temperature value while the electric motor 164 is stalled may avoid damage to the electric motor 164 due to overheating or due to a magnet of the electric motor 164 becoming demagnetized.

For example, the one or more processors 110 may be configured to maintain the temperature of the electric motor below the threshold temperature value while the electric motor 164 is stalled by reducing a voltage level of the predetermined voltage signal or by stopping (e.g., temporarily stopping) the supply of power to the electric motor 164. For example, the threshold temperature value may be about 60 degrees Celsius. For example, if the temperature detected by the temperature sensor 182 indicates that the temperature of the electric motor 164 is equal to or greater than the threshold temperature value (or is rapidly approaching the threshold temperature value), the one or more processors 110 may be configured to control the driver circuitry 162 to stop supplying power to the electric motor 164 to bring the electric motor 164 out of the stall condition or stall state.

In another example, the one or more processors 110 may be configured to control the driver circuitry 162 to stop supplying power to the electric motor 164 after the electric motor 164 has been in the stall condition or stall state for a period of time greater than a threshold period of time which may be adjustable according to a voltage level that is applied and/or may be settable by a user via the input device 150 (e.g., 1 minute, 5 minutes, 10 minutes, etc.). For example, a higher voltage level may have a lower threshold period of time relative to a lower voltage level.

For example, the one or more processors 110 may be configured to control the driver circuitry 162 to drive the electric motor 164 according to the predetermined voltage signal to cause the electric motor 164 to stall and generate heat at a predetermined rate. For example, the predetermined rate may be a rate of about three degrees Celsius per second. Therefore, the temperature of the electric motor 164 increases steadily over time to provide thermal cues to a user who is in contact (directly or indirectly) with the electronic apparatus 100 having the electric motor 164. As will be described with respect to FIG. 4, in some implementations, the electric motor 164 may be driven according to the predetermined voltage signal so as to cause the electric motor 164 to stall and generate heat at a predetermined rate (e.g., of about three degrees Celsius per second) above a normal skin temperature for a human (e.g., about 30 degrees Celsius to 35 degrees Celsius).

In some implementations, the electric motor 164 may be driven to produce both vibrations and heat. For example, if the electric motor 164 is a linear resonant actuator (LRA) which includes a vibration device 166, the LRA can be driven with a high amplitude AC signal to generate a vibration of the vibration device 166 of the LRA so that a user can feel or sense the electronic apparatus 100 being vibrated. The electronic apparatus 100 can alternate between controlling the driver circuitry 162 to drive the LRA according to the predetermined voltage signal (e.g., the DC voltage signal or the PWM signal) so as to cause the electric motor to stall and generate heat, and controlling the driver circuitry 162 to drive the LRA according to another predetermined voltage signal (e.g., the AC signal) so as to cause the electronic apparatus 100 to vibrate.

Figure 3:
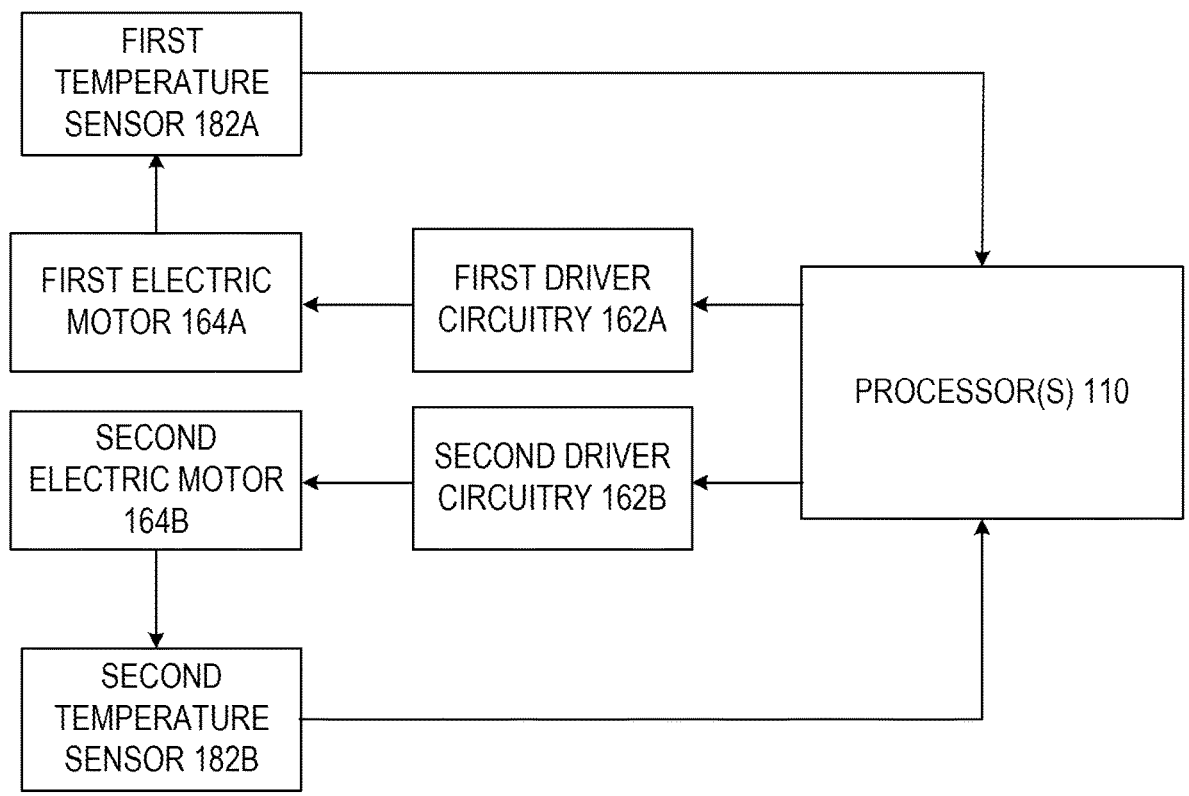
FIG. 3 is an example illustration of a thermal feedback system, according to one or more examples of the disclosure.

Referring to FIG. 3, an example illustration of a thermal feedback system is shown, according to one or more examples of the disclosure. In FIG. 3, the thermal feedback system 3000 may be provided to the electronic apparatus 100 and includes the one or more processors 110, first driver circuitry 162A, a first electric motor 164A, a first temperature sensor 182A, second driver circuitry 162B, a second electric motor 164B, and a second temperature sensor 182B.

The functionality and operations of the first driver circuitry 162A and second driver circuitry 162B are the same as driver circuitry 162 and will not be described again for the sake of brevity. Similarly, functionality and operations of the first electric motor 164A and second electric motor 164B are the same as electric motor 164 and will not be described again for the sake of brevity, and functionality and operations of the first temperature sensor 182A and second temperature sensor 182B are the same as temperature sensor 182 and will not be described again for the sake of brevity. In the example of FIG. 3, the first driver circuitry 162A and second driver circuitry 162B are controlled by the same one or more processors 110. However, in another example, the first driver circuitry 162A and second driver circuitry 162B may be controlled by different processors, for example, independently controlled by different processors. In the example of FIG. 3, two electric motors are illustrated, and can be driven according to a predetermined voltage signal to cause the first electric motor 164A and second electric motor 164B to stall and generate heat (e.g., without causing the electronic apparatus 100 to move or vibrate). However, the disclosure is not so limited and more than two electric motors may be provided to the electronic apparatus 100.

In the example of FIG. 3, the electronic apparatus 100 includes a plurality of electric motors (e.g., a plurality of LRAs). For example, a first LRA may correspond to the first electric motor 164A and the first driver circuitry 162A may be configured to drive the first electric motor 164A and a second LRA may correspond to the second electric motor 164B and the second driver circuitry 162B may be configured to drive the second electric motor 164B.

The one or more processors 110 may be configured to control the first driver circuitry 162A to drive the first electric motor 164A according to the predetermined voltage signal so as to cause the first electric motor 164A to stall and generate heat, and simultaneously control the second driver circuitry 162B to drive the second electric motor 164B according to another predetermined voltage signal so as to cause the electronic apparatus 100 to vibrate. In some examples, the first electric motor 164A may be driven to stall and generate heat for a first predetermined period of time and the second electric motor 164B may be driven to cause the electronic apparatus 100 to vibrate for a second predetermined period of time, in a sequential manner (which may be partially overlapping or non-overlapping). Therefore, the electronic apparatus 100 can use a combination of LRAs to provide notifications or messages, or can provide therapeutic heating and vibrational treatment, for example, according to a pattern of the heating and vibrations provided via the combination of LRAs and/or according to a location of the first electric motor 164A and the second electric motor 164B.

As another example, the one or more processors 110 may be configured to control the first driver circuitry 162A to drive the first electric motor 164A according to the predetermined voltage signal so as to cause the first electric motor 164A to stall and generate heat, and simultaneously control the second driver circuitry 162B to drive the second electric motor 164B according to the predetermined voltage signal so as to cause the second electric motor 164B to stall and generate heat. In some examples, the first electric motor 164A may be driven to stall and generate heat for a first predetermined period of time and the second electric motor 164B may be driven to stall and generate heat for a second predetermined period of time, in a sequential manner (which may be partially overlapping or non-overlapping). Therefore, the electronic apparatus 100 can use a combination of LRAs to provide notifications or messages, or can provide therapeutic heating, for example, according to a pattern of the heating provided via the combination of LRAs and/or according to a location of the first electric motor 164A and the second electric motor 164B.

For example, the first electric motor 164A and the second electric motor 164B may be disposed adjacent to one another, for example, in a stacked manner. When the first electric motor 164A (e.g., first LRA) and second electric motor 164B (e.g., second LRA) are arranged or disposed to be adjacent to one another, the heat generated from the stalled first electric motor 164A can be directed in a same direction as the heat from generated from the stalled second electric motor 164B such that a user can experience an increased or enhanced rate (or greater amount) of heating compared to a single stalled electric motor, by virtue of the accumulated (sum) of heat generated by the first electric motor 164A and second electric motor 164B. For example, notifications or simple messages may be transmitted to a user by stalling a single electric motor (e.g., to convey that a text message has been received by the user's smartwatch or smartphone), by stalling multiple electric motors (e.g., to convey that a phone call or voicemail message has been received by the user's smartwatch or smartphone), or by switching between stalling a single electric motor and stalling multiple electric motors (e.g., to convey that an email message has been received in the user's inbox or the electronic apparatus has a low battery condition).

Figure 4:
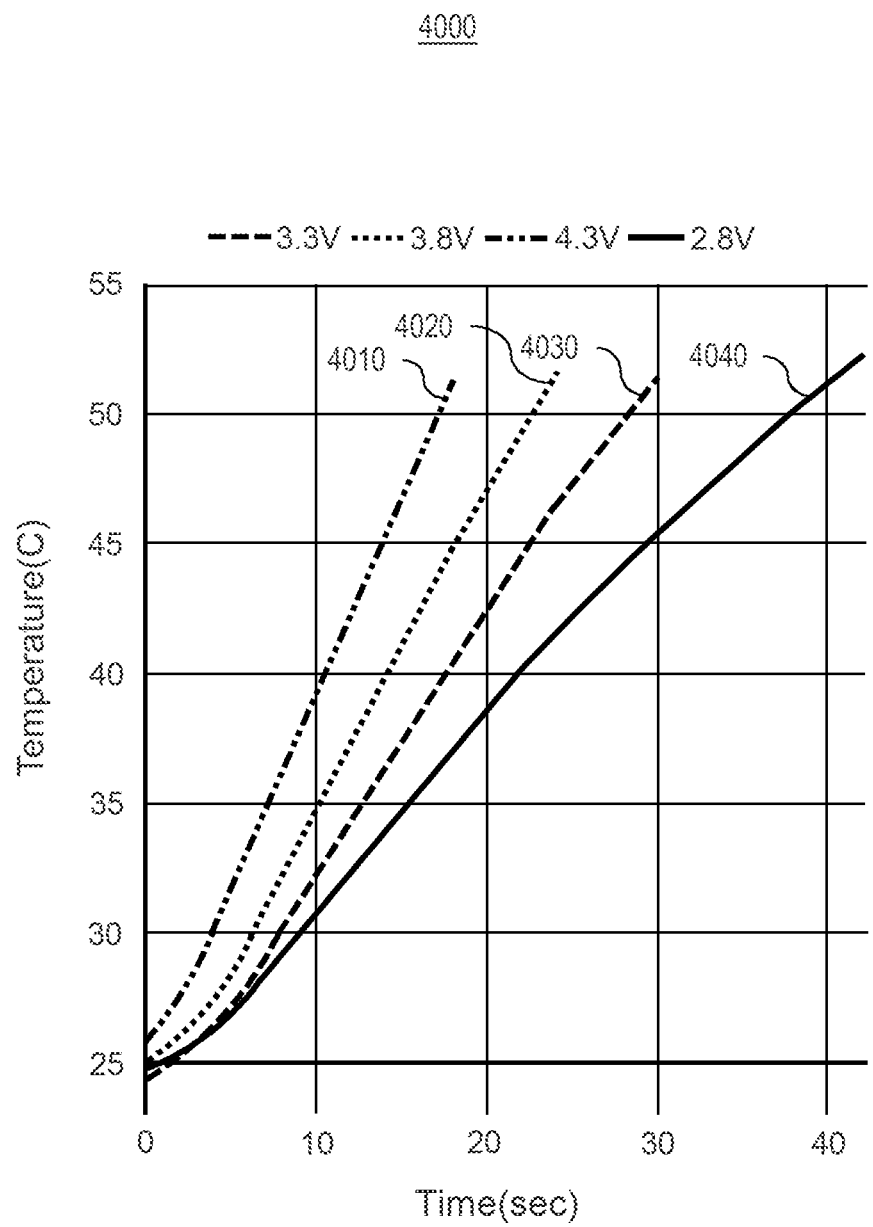
FIG. 4 is an example illustration of a graph depicting a change in temperature of an electric motor over time for various applied voltage levels, according to one or more examples of the disclosure.

Referring to FIG. 4, an example illustration of a graph depicting a change in temperature of an electric motor over time for various applied voltage levels is shown, according to one or more examples of the disclosure. In FIG. 4, the graph 4000 includes a first curve 4010 representing a first predetermined voltage signal, a second curve 4020 representing a second predetermined voltage signal, a third curve 4030 representing a third predetermined voltage signal, and a fourth curve 4040 representing a fourth predetermined voltage signal.

For example, the one or more processors 110 may control the driver circuitry 162 according to the first predetermined voltage signal to cause the electric motor 164 to stall and generate heat, as shown by the first curve 4010 in FIG. 4. For example, the driver circuitry 162 may be controlled to drive the electric motor 164 by applying a voltage of 4.3 volts according to the first predetermined voltage signal. For example, the one or more processors 110 may control the driver circuitry 162 according to the second predetermined voltage signal to cause the electric motor 164 to stall and generate heat, as shown by the second curve 4020 in FIG. 4. For example, the driver circuitry 162 may be controlled to drive the electric motor 164 by applying a voltage of 3.8 volts according to the second predetermined voltage signal. For example, the one or more processors 110 may control the driver circuitry 162 according to the third predetermined voltage signal to cause the electric motor 164 to stall and generate heat, as shown by the third curve 4030 in FIG. 4. For example, the driver circuitry 162 may be controlled to drive the electric motor 164 by applying a voltage of 3.3 volts according to the third predetermined voltage signal. For example, the one or more processors 110 may control the driver circuitry 162 according to the fourth predetermined voltage signal to cause the electric motor 164 to stall and generate heat, as shown by the fourth curve 4040 in FIG. 4. For example, the driver circuitry 162 may be controlled to drive the electric motor 164 by applying a voltage of 2.8 volts according to the fourth predetermined voltage signal.

For example, the electric motor 164 (e.g., a LRA) can be driven according to different predetermined voltage signals having respective voltage levels to vary a rate of increase of the temperature of the electric motor 164 over time when the electric motor 164 is in the stall condition. For example, when the electric motor 164 is driven at 3.3 volts in a stall condition as shown by the third curve 4030, a temperature of the electric motor 164 may rise from about 25 degrees Celsius to about 50 degrees Celsius in about 28 seconds, and when the electric motor is driven at 4.3 volts in a stall condition as shown by the first curve 4010, a temperature of the electric motor 164 may rise from about 25 degrees Celsius to about 50 degrees Celsius in about 18 seconds. By applying different voltage levels, different thermal feedback experiences can be felt by the user, which may be implemented by the thermal feedback system 160A for providing notifications or messages, or for providing therapeutic effects. For example, a lower voltage level (e.g., 2.8 V) may be more appropriate and implemented by the thermal feedback system 160A for providing a gradual warming effect to a user over a longer period of time (e.g., to calm an excited user), while a higher voltage level (e.g., 4.3 V) having a sharper or steeper increase in temperature in a relatively shorter period of time may be more appropriate and implemented by the thermal feedback system 160A for providing a quicker warming effect, for example, to alert the user or provide a notification to the user.

According to examples of the disclosure, the one or more processors 110 may be configured to control the driver circuitry 162 to cause the electric motor 164 to be driven according to the predetermined voltage signal so as to cause the electric motor 164 to stall and generate heat at a predetermined rate (e.g., about three degrees Celsius per second, about one degree Celsius per second, about one-half degree Celsius per second, etc.). For example, the electric motor 164 may be driven according to the predetermined voltage signal so as to cause the electric motor 164 to stall and generate heat at the predetermined rate at a predetermined temperature range (e.g., a temperature range which is above a normal skin temperature for a human which is about 30 degrees Celsius to 35 degrees Celsius).

Figure 5:
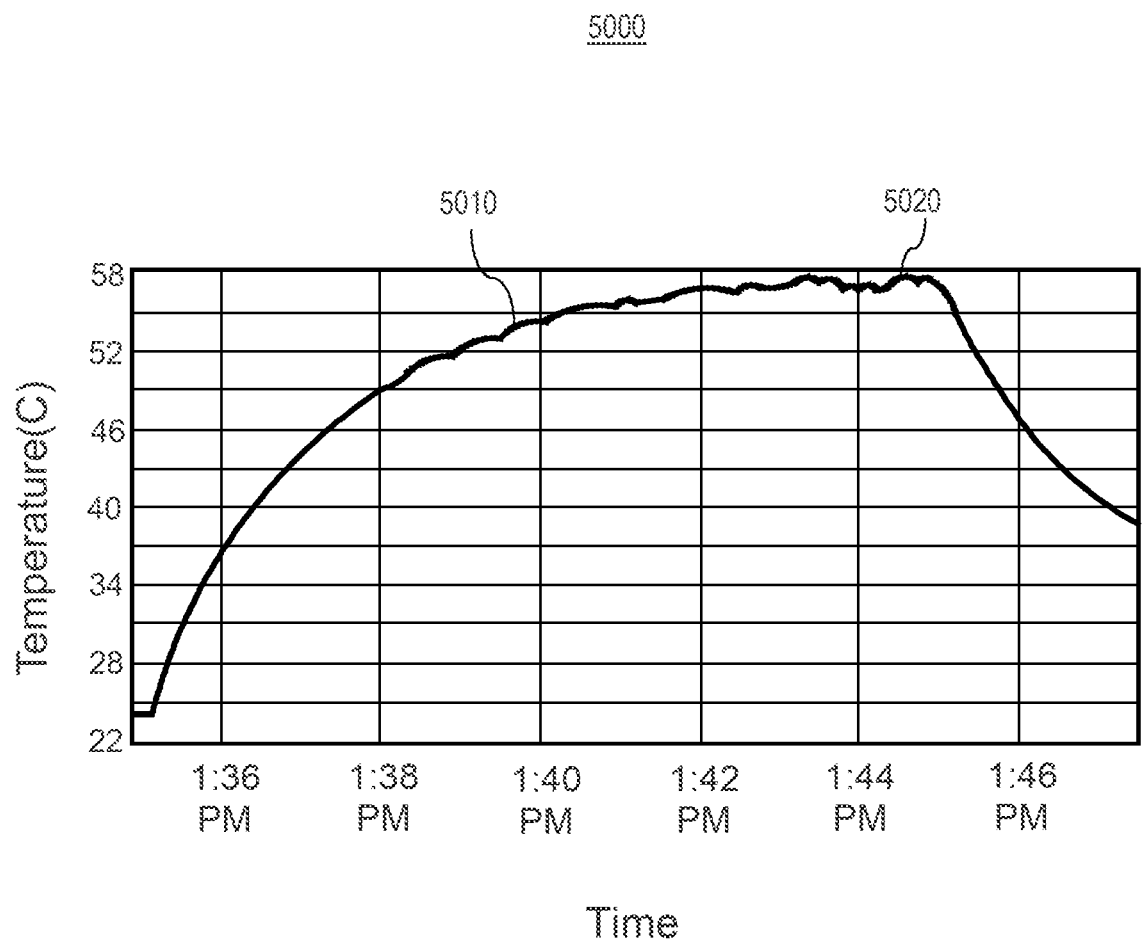
FIG. 5 is an example illustration of a graph depicting a change in temperature of an electric motor over time, according to one or more examples of the disclosure.

Referring to FIG. 5, an example illustration of a graph depicting a change in temperature of an electric motor over time is shown, according to one or more examples of the disclosure. In FIG. 5, the graph 5000 includes a curve 5010 representing a predetermined voltage signal which is applied by the driver circuitry 162 to drive the electric motor 164 to cause the electric motor 164 to stall and generate heat. For example, the temperature of the electric motor 164 may be increased from about 24 degrees Celsius to about 58 degrees Celsius over the course of about ten minutes. At a time corresponding to a point on the curve 5010 which is annotated with reference numeral 5020, the one or more processors 110 may determine based on the temperature of the electric motor 164 detected by the temperature sensor 182 that the temperature of the electric motor 164 is about to exceed a threshold temperature value. In response to the one or more processors 110 determining based on the temperature of the electric motor 164 detected by the temperature sensor 182 that the temperature of the electric motor 164 is about to exceed the threshold temperature value, the electric motor 164 may control the driver circuitry 162 such that power supplied to the electric motor 164 is cut off, resulting in the temperature of the electric motor 164 decreasing and being maintained below the threshold temperature value. In another example, in response to the one or more processors 110 determining based on the temperature of the electric motor 164 detected by the temperature sensor 182 that the temperature of the electric motor 164 is about to exceed the threshold temperature value, the electric motor 164 may control the driver circuitry 162 to reduce a voltage level supplied to the electric motor 164, resulting in the temperature of the electric motor 164 increasing at a slower rate so as to maintain the temperature of the electric motor 164 below the threshold temperature value.

Figure 6:
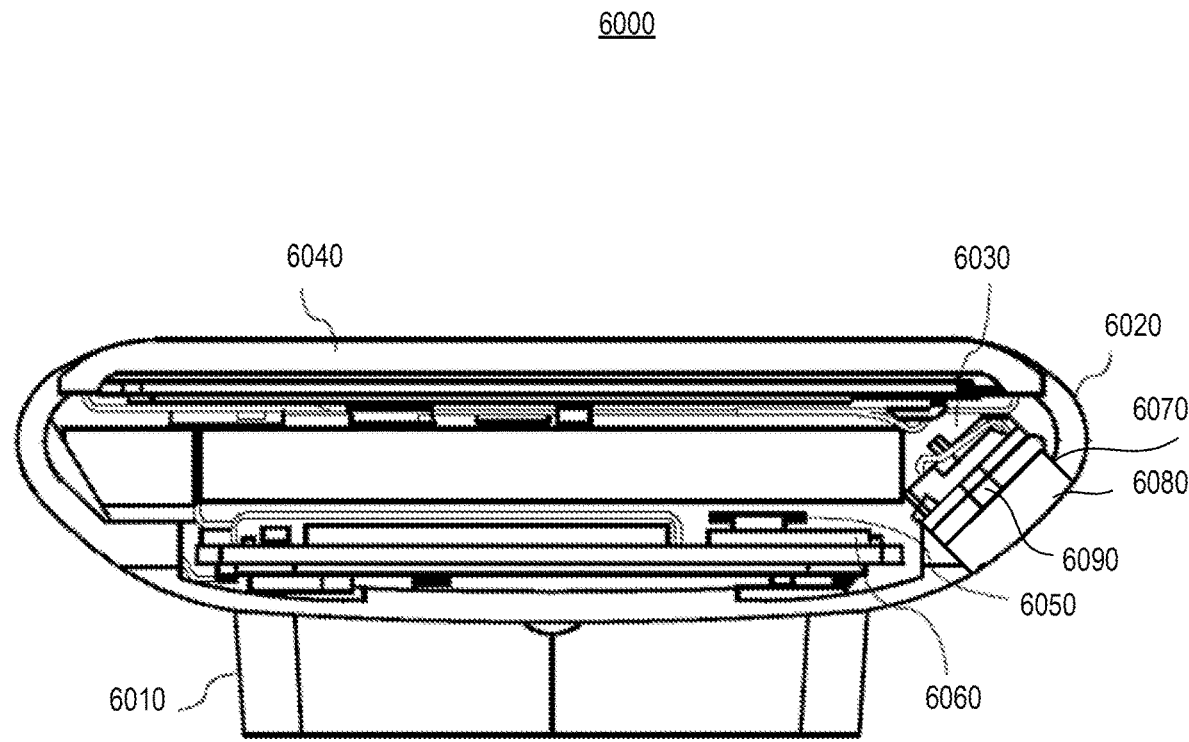
FIG. 6 is an example illustration of a wearable electronic apparatus, according to one or more examples of the disclosure.

Referring to FIG. 6, an example illustration of a wearable electronic apparatus is shown, according to one or more examples of the disclosure. In FIG. 6, the electronic apparatus 6000 corresponds to a wearable computing device such as a smartwatch which can be worn, for example, on an arm (e.g., wrist) of a user. However, the disclosure is not limited to this example and the electronic apparatus 6000 may be a device other than a wearable computing device, such as an electronic article of clothing, an electronic handheld gaming device, electronic glasses, or electronic jewelry, and the like.

The electronic apparatus 6000 includes a band 6010 which may be used to secure the electronic apparatus 6000 to the arm (e.g., wrist) of the user. For example, the electronic apparatus 6000 can include a body 6020 having a cavity 6030 in which one or more electronic components are disposed (e.g., disposed on one or more printed circuit boards). The electronic apparatus 6000 can include a cover 6040, for example to protect a display of the electronic apparatus 6000 from being scratched or damaged. For example, the electronic apparatus 6000 can include a printed circuit board 6050 disposed within the cavity 6030 of the body 6020. For example, the printed circuit board 6050 may include electronic components such as the one or more processors 110 and/or the one or memory devices 120, and be mounted on a main logic board 6060. The electronic apparatus 6000 may include an electric motor 6070 that is accommodated inside motor housing 6080, and a temperature sensor 6090 that is disposed on an outer surface or inner surface of the motor housing 6080. For example, the motor housing 6080 may be formed to be flush with an outer side of the body 6020 such that the motor housing 6080 can come into contact with a part of the body of the user. For example, when the electronic apparatus 6000 is worn by a user, the motor housing 6080 contacts a body part of the user such that the heat generated while the electric motor 6070 is stalled warms the body part of the user via the motor housing 6080, which can come into direct contact with the body part of the user or indirect contact.

The electronic apparatus 6000 can further include one or more batteries and one or more other sensors (not shown) such as an emotional state sensor 184 that are disposed within the cavity 6030 defined by the body 6020 or integrated with the body 6020 or cover 6040. For example, the emotional state sensor 184 may be configured to detect an emotional state of a user (e.g., to detect whether the user is angry, sad, excited, depressed, anxious, etc.). For example, the electronic apparatus 6000 may be configured to provide thermal feedback to the user via the electric motor 6070 based on the detected emotional state (e.g., in response to detecting that the user is angry, sad, anxious, depressed, etc.). For example, the one or more processors 110 may be configured to control the driver circuitry 162 to drive the electric motor 6070 according to the predetermined voltage signal to cause the electric motor 6070 to stall and generate heat, based on the emotional state detected by the emotional state sensor 184. In some implementations, the electronic apparatus 6000 may include an input device such as a touchscreen display or a crown by which the user can provide an input requesting the electronic apparatus 6000 to provide the thermal feedback.

Figure 7:
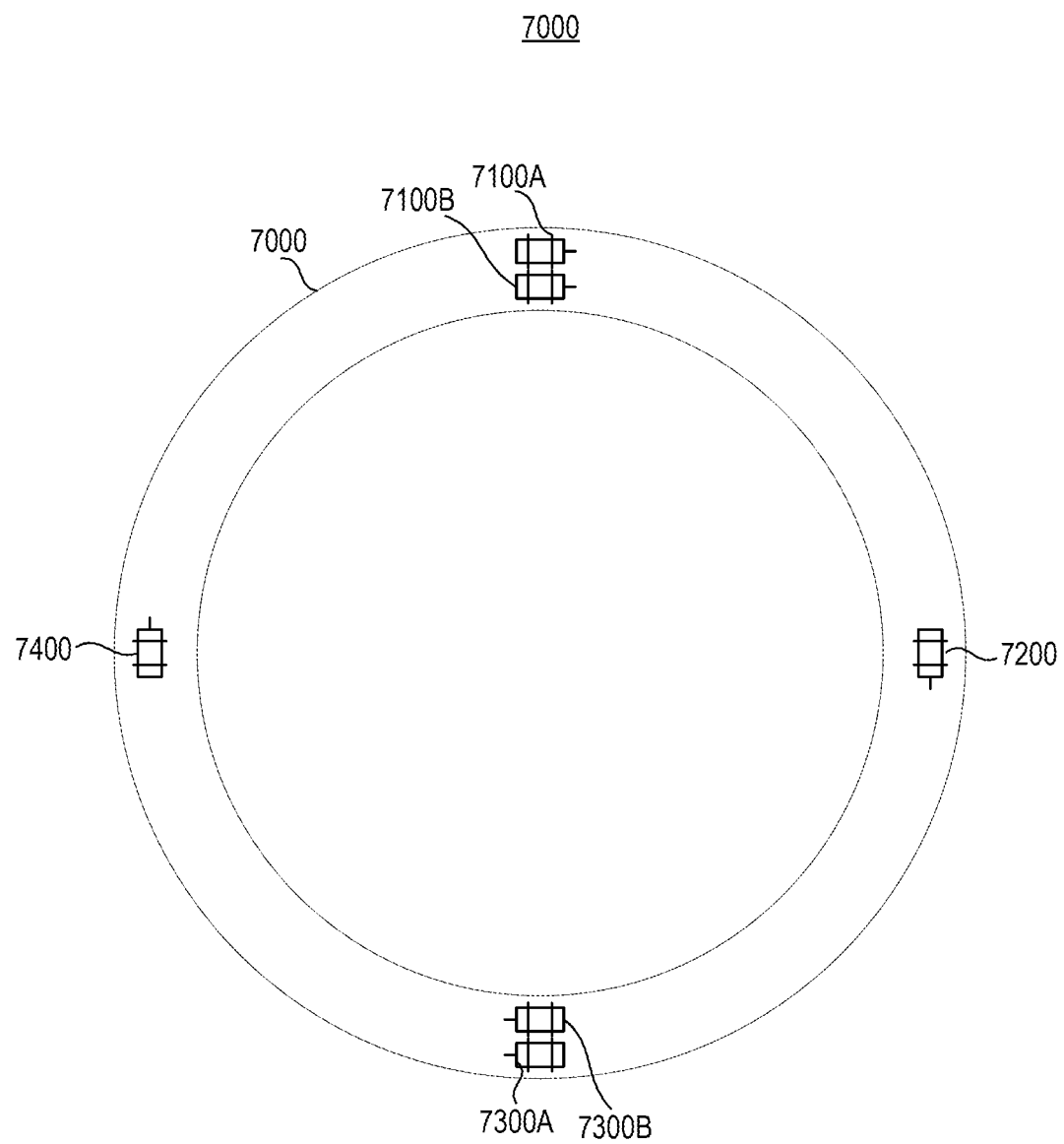
FIG. 7 is an example illustration of a wearable electronic apparatus, according to one or more examples of the disclosure.

Referring to FIG. 7, an example illustration of a wearable electronic apparatus is shown, according to one or more examples of the disclosure. In FIG. 7, the wearable electronic apparatus 7000 is illustrated in a simpler form to simply show example locations of various electric motors including first electric motor 7100A, second electric motor 7100B, third electric motor 7200, fourth electric motor 7300A, fifth electric motor 7300B, and sixth electric motor 7400. The wearable electronic apparatus 7000 may be an electronic ring, an electronic necklace, an electronic article of clothing such as a hat, etc. The wearable electronic apparatus 7000 may include other components of the thermal feedback system 160A including appropriate driver circuitry, temperature sensors, and one or more processors, however these components are omitted from FIG. 7 for the sake of clarity.

For example, the first electric motor 7100A and the second electric motor 7100B may be disposed adjacent to one another, for example, in a stacked manner. When the first electric motor 7100A (e.g., first LRA) and second electric motor 7100B (e.g., second LRA) are arranged or disposed to be adjacent to one another, the heat generated from the stalled first electric motor 7100A can be directed in a same direction as the heat from generated from the stalled second electric motor 7100B such that a user can experience an increased or enhanced rate (or greater amount) of heating compared to a single stalled electric motor, by virtue of the accumulated (sum) of heat generated by the first electric motor 7100A and second electric motor 7100B. For example, notifications or simple messages may be transmitted to a user by stalling a single electric motor such as third electric motor 7200 (e.g., to convey that a text message has been received by the user's smartwatch or smartphone), by stalling multiple electric motors such as third electric motor 7200 and sixth electric motor 7400 (e.g., to convey that a phone call or voicemail message has been received by the user's smartwatch or smartphone), or by switching between stalling a single electric motor (e.g., third electric motor 7200) and stalling multiple electric motors such as fourth electric motor 7300A and fifth electric motor 7300B (e.g., to convey that an email message has been received in the user's inbox or the electronic apparatus has a low battery condition).

In addition, the location of each electric motor may also indicate the type of notification or message being communicated. For example, the electric motors may be particularly arranged so as to provide a specific thermal feedback to the user (e.g., at specific times, at specific locations, etc.). For example, the wearable electronic apparatus 7000 includes electric motors which are spaced apart in a circumferential direction so that a user may receive varying thermal feedback at various touchpoints to provide different indications or notifications, or to provide different heating sensations to the user. Likewise, for an electronic piece of jewelry such as a necklace or bracelet, the LRAs may also be spaced apart in a circumferential direction so that a user may receive varying thermal feedback at various touchpoints to provide different indications or notifications, or to provide different heating sensations to the user.

For example, a user may provide an input (e.g., via the input device 150) to the thermal feedback notification and messaging application 130, the thermal feedback therapeutic application 140, the thermal feedback notification and messaging application 330, or the thermal feedback therapeutic application 340 to define configurations or profiles for how a user can be notified of a particular message or notification, or of how a user can receive a therapeutic treatment. For example, the user can define a notification or message profile or a therapeutic treatment profile by providing one or more inputs selecting one or more electric motors, setting respective voltage levels to be applied to the one or more electric motors, and selecting respective durations of time for which the voltage level is to be applied to the one or more electric motors. The defined notification or message profile or the therapeutic treatment profile can be associated with a function or operation of the electronic apparatus 100 or of the one or more external computing devices 400.

For example, the thermal feedback notification and messaging application 130, the thermal feedback therapeutic application 140, the thermal feedback notification and messaging application 330, or the thermal feedback therapeutic application 340 may include default configurations or profiles which are associated with a function or operation of the electronic apparatus 100 or of an external computing device 400. The default configurations or profiles may also be modified by the user.

For example, when the electronic apparatus 100 or the one or more external computing devices 400 are operated or experience a state change (e.g., receive an incoming phone call, receive a text message, receive an email, activate a heating or cooling function, incur a low battery condition, activate a security alarm, etc.), the one or more processors 110 may be configured to control the driver circuitry 162 to drive the electric motor 164 according to a predetermined voltage signal to cause the electric motor 164 to stall and generate heat, to thereby notify a user of the function of the electronic apparatus 100 or the one or more external computing devices 400 based on the particular operation or state change being experienced by the electronic apparatus 100 or the one or more external computing devices 400. For example, the one or more external computing devices 400 can communicate with the electronic apparatus 100 via network 200 and/or via server computing system 300, regarding the operation or state change of the one or more external computing devices 400.

Figure 8:
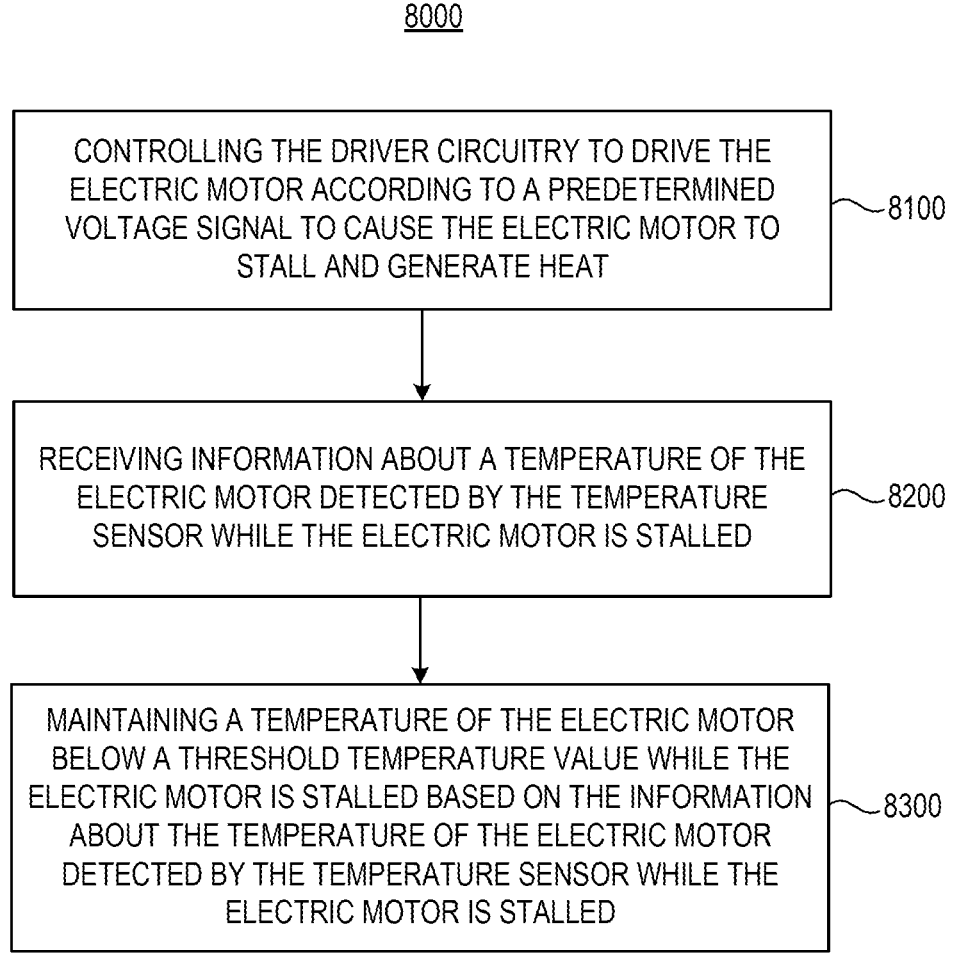
FIG. 8 is a flow diagram of an example, non-limiting computer-implemented method according to one or more examples of the disclosure.

Referring to FIG. 8, a flow diagram of an example, non-limiting computer-implemented method according to one or more examples of the disclosure is illustrated. The flow diagram FIG. 8 illustrates a method 8000 for causing an electric motor to stall and generate heat, receiving information about a temperature of the electric motor while the motor is stalled, and ensuring that the temperature of the electric motor is kept below a threshold temperature value while the electric motor is stalled.

At 8100, the method includes controlling the driver circuitry to drive the electric motor according to a predetermined voltage signal to cause the electric motor to stall and generate heat. For example, the one or more processors 110 may be configured to control driver circuitry 162 to drive the electric motor 164 (e.g., a linear resonant actuator) according to a predetermined voltage signal (e.g., a DC voltage signal or a pulse width modulation (PWM) signal) to cause the electric motor 164 to stall and thereby generate heat. For example, the heat may be transferred to a user of the electronic apparatus who is in direct or indirect contact with a motor housing which houses the electric motor 164.

At 8200, the method includes receiving information about a temperature of the electric motor detected by the temperature sensor while the electric motor is stalled. For example, the temperature sensor 182 may be configured to detect a temperature of the electric motor 164 while the electric motor 164 is stalled. For example, the temperature sensor 182 may be disposed on an outer (external or exterior) surface (outer portion) of the motor housing, or may be disposed on an inner (internal or interior) surface (inner portion) of the motor housing.

At 8300, the method includes maintaining a temperature of the electric motor below a threshold temperature value while the electric motor is stalled based on the information about the temperature of the electric motor detected by the temperature sensor while the electric motor is stalled. For example, the one or more processors 110 may be configured to maintain the temperature of the electric motor 164 below a threshold temperature value while the electric motor 164 is stalled based on information about the temperature detected by the temperature sensor 182 while the electric motor 164 is stalled. For example, the one or more processors 110 may be configured to maintain the temperature of the electric motor 164 below the threshold temperature value while the electric motor is stalled by reducing a voltage level of the predetermined voltage signal or by stopping the supply of power to the electric motor 164, via the driver circuitry 162. For example, in some implementations, in response to the one or more processors 110 determining or predicting that the temperature of the electric motor 164 will overshoot the threshold temperature value, the one or more processors 110 may be configured reduce the voltage level of the predetermined voltage signal or stop the supply of power to the electric motor 164, via the driver circuitry 162. For example, in some implementations, in response to the temperature being detected by the temperature sensor 182 being greater than or equal to the threshold temperature value while the electric motor 164 is stalled, the one or more processors 110 may be configured to control the driver circuitry 162 to stop supplying power to the electric motor 164.

Aspects of the above-described example embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks, Blue-Ray disks, and DVDs; magneto-optical media such as optical discs; and other hardware devices that are specially configured to store and perform program instructions, such as semiconductor memory, read-only memory (ROM), random access memory (RAM), flash memory, USB memory, and the like. Examples of program instructions include both machine code, such as produced by a compiler, and files containing higher level code that may be executed by the computer using an interpreter. The program instructions may be executed by one or more processors. The described hardware devices may be configured to act as one or more software modules in order to perform the operations of the above-described embodiments, or vice versa. In addition, a non-transitory computer-readable storage medium may be distributed among computer systems connected through a network and computer-readable codes or program instructions may be stored and executed in a decentralized manner. In addition, the non-transitory computer-readable storage media may also be embodied in at least one application specific integrated circuit (ASIC) or Field Programmable Gate Array (FPGA).

Each block of the flowchart illustrations may represent a unit, module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently (simultaneously) or the blocks may sometimes be executed in the reverse order, depending upon the functionality involved.

While the disclosure has been described with respect to various example embodiments, each example is provided by way of explanation, not limitation of the disclosure. Those skilled in the art, upon attaining an understanding of the foregoing, can readily produce alterations to, variations of, and equivalents to such embodiments. Accordingly, the disclosure does not preclude inclusion of such modifications, variations and/or additions to the disclosed subject matter as would be readily apparent to one of ordinary skill in the art. For example, features illustrated or described as part of one embodiment can be used with another embodiment to yield a still further embodiment. Thus, it is intended that the disclosure covers such alterations, variations, and equivalents.

What is claimed is:

1. An electronic apparatus, comprising:
    an electric motor;
    driver circuitry configured to drive the electric motor;
    a temperature sensor configured to detect a temperature of the electric motor; and
    one or more processors configured to:
        control the driver circuitry to drive the electric motor according to a predetermined voltage signal to cause the electric motor to stall and generate heat and control the driver circuitry to drive the electric motor according to another predetermined voltage signal to cause the electronic apparatus to vibrate,
        receive information about the temperature of the electric motor detected by the temperature sensor while the electric motor is stalled, and
        maintain a temperature of the electric motor below a threshold temperature value while the electric motor is stalled based on the information about the temperature of the electric motor detected by the temperature sensor while the electric motor is stalled.

2. The electronic apparatus of claim 1, wherein the electric motor includes an alternating current linear electric motor.

3. The electronic apparatus of claim 1, wherein the driver circuitry includes an H-bridge circuit or a D-class amplifier.

4. The electronic apparatus of claim 1, the predetermined voltage signal is a direct current voltage signal or a pulse width modulation voltage signal.

5. The electronic apparatus of claim 1, further comprising a motor housing which houses the electric motor, and
    the temperature sensor is attached to an outside surface of the motor housing or an inside surface of the motor housing.

6. The electronic apparatus of claim 5, wherein when the electronic apparatus is worn by a user, the motor housing contacts a body part of the user such that the heat generated while the electric motor is stalled warms the body part of the user via the motor housing.

7. The electronic apparatus of claim 1, wherein the one or more processors are configured to control the driver circuitry to drive the electric motor according to the predetermined voltage signal to cause the electric motor to stall and generate heat at a predetermined rate.

8. The electronic apparatus of claim 1, wherein the one or more processors are configured to maintain the temperature of the electric motor below the threshold temperature value while the electric motor is stalled by reducing a voltage level of the predetermined voltage signal or by stopping a supply of power to the electric motor.

9. The electronic apparatus of claim 1, wherein the temperature sensor includes at least one of a thermistor or a thermocouple.

10. The electronic apparatus of claim 1, further comprising:
    a further electric motor;
    further driver circuitry configured to drive the further electric motor, and
    the one or more processors are configured to:
        control the further driver circuitry to drive the further electric motor according to another predetermined voltage signal to cause the electronic apparatus to vibrate.

11. The electronic apparatus of claim 1, further comprising:
    a further electric motor:
    further driver circuitry configured to drive the further electric motor, and
    the one or more processors are configured to:
        control the further driver circuitry to drive the further electric motor according to the predetermined voltage signal to cause the further electric motor to stall and generate heat.

12. The electronic apparatus of claim 1, wherein the electronic apparatus includes an electronic article of clothing, an electronic handheld gaming device, an electronic watch, electronic glasses, or electronic jewelry.

13. The electronic apparatus of claim 1, further comprising an input device to receive an input from a user,
    wherein in response to the input being received by the input device, the one or more processors are configured to control the driver circuitry to drive the electric motor according to the predetermined voltage signal to cause the electric motor to stall and generate heat.

14. The electronic apparatus of claim 1, wherein in response to a function of the electronic apparatus or an external computing device being operated, the one or more processors are configured to control the driver circuitry to drive the electric motor according to the predetermined voltage signal to cause the electric motor to stall and generate heat, to thereby notify a user of the function of the electronic apparatus or the external computing device being operated.

15. The electronic apparatus of claim 1, wherein in response to the temperature being detected by the temperature sensor being greater than or equal to the threshold temperature value while the electric motor is stalled, the one or more processors are configured to control the driver circuitry to stop supplying power to the electric motor.

16. The electronic apparatus of claim 1, wherein the one or more processors are configured to control the driver circuitry to drive the electric motor according to the predetermined voltage signal to cause the electric motor to stall and generate heat, without causing the electronic apparatus to vibrate.

17. The electronic apparatus of claim 1, further comprising a sensor configured to detect an emotional state of a user of the electronic apparatus,
    wherein the one or more processors are configured to control the driver circuitry to drive the electric motor according to the predetermined voltage signal to cause the electric motor to stall and generate heat, based on the emotional state detected by the sensor.

18. A computer-implemented method for an electronic apparatus including an electric motor, driver circuitry, and a temperature sensor, the method comprising:
controlling the driver circuitry to drive the electric motor according to a predetermined voltage signal to cause the electric motor to stall and generate heat;
controlling the driver circuitry to drive the electric motor according to another predetermined voltage signal to cause the electronic apparatus to vibrate;
receiving information about a temperature of the electric motor detected by the temperature sensor while the electric motor is stalled; and
maintaining a temperature of the electric motor below a threshold temperature value while the electric motor is stalled based on the information about the temperature of the electric motor detected by the temperature sensor while the electric motor is stalled.

19. A non-transitory computer-readable medium which stores instructions that are executable by one or more processors of an electronic apparatus, the instructions comprising:
instructions to cause the one or more processors to control driver circuitry of the electronic apparatus to drive an electric motor of the electronic apparatus according to a predetermined voltage signal to cause the electric motor to stall and generate heat;
instructions to cause the one or more processors to control the driver circuitry of the electronic apparatus to drive the electric motor of the electronic apparatus according to another predetermined voltage signal to cause the electronic apparatus to vibrate;
instructions to receive information about a temperature of the electric motor detected by a temperature sensor of the electronic apparatus while the electric motor is stalled; and
instructions to maintain a temperature of the electric motor below a threshold temperature value while the electric motor is stalled based on the information about the temperature of the electric motor detected by the temperature sensor while the electric motor is stalled.

20. An electronic apparatus, comprising:
a first electric motor,
a second electric motor;
first driver circuitry configured to drive the first electric motor;
second driver circuitry configured to drive the second electric motor;
a temperature sensor configured to detect a temperature of the first electric motor; and
one or more processors configured to:
control the first driver circuitry to drive the first electric motor according to a predetermined voltage signal to cause the first electric motor to stall and generate heat,
control the second driver circuitry to drive the second electric motor according to another predetermined voltage signal to cause the electronic apparatus to vibrate, and
receive information about the temperature of the first electric motor detected by the temperature sensor while the first electric motor is stalled, and
maintain a temperature of the first electric motor below a threshold temperature value while the first electric motor is stalled based on the information about the temperature of the first electric motor detected by the temperature sensor while the first electric motor is stalled.

21. An electronic apparatus, comprising:
a first electric motor,
a second electric motor disposed adjacent to the first electric motor;
first driver circuitry configured to drive the first electric motor;
second driver circuitry configured to drive the second electric motor;
a temperature sensor configured to detect a temperature of the first electric motor; and
one or more processors configured to:
control the first driver circuitry to drive the first electric motor according to a predetermined voltage signal to cause the first electric motor to stall and generate heat,
control the second driver circuitry to drive the second electric motor according to the predetermined voltage signal to cause the second electric motor to stall and generate heat, and
receive information about the temperature of the first electric motor detected by the temperature sensor while the first electric motor is stalled, and
maintain a temperature of the first electric motor below a threshold temperature value while the first electric motor is stalled based on the information about the temperature of the first electric motor detected by the temperature sensor while the first electric motor is stalled.

* * * * *